Oct. 30, 1928.
I. S. MERRELL
FOOD PRODUCT
Filed Sept. 27, 1923
1,689,357
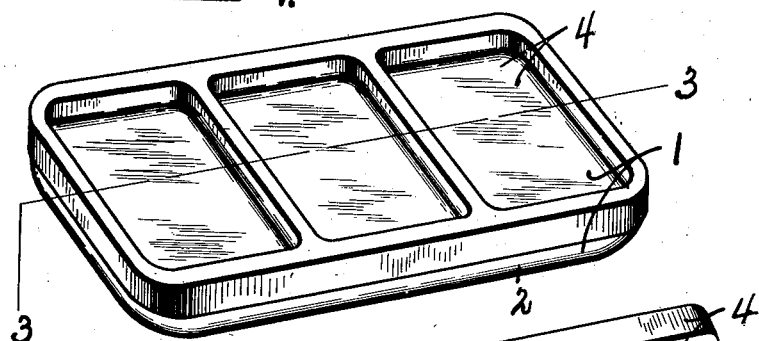
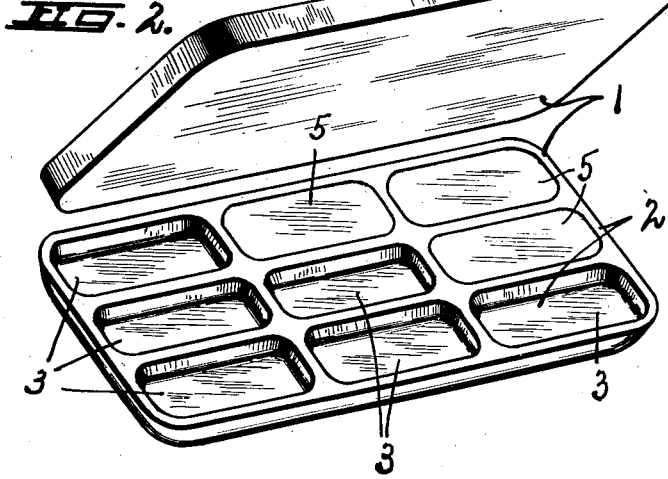
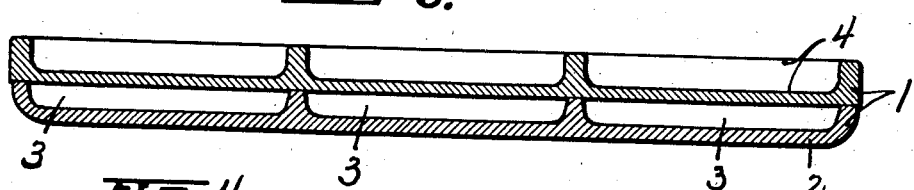
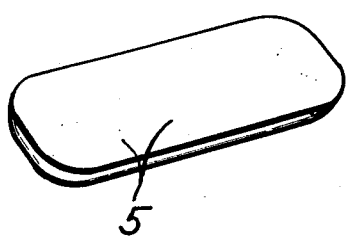
INVENTOR
I. S. Merrell
BY
ATTORNEYS Patented Oct. 30, 1928.

1,689,357

UNITED STATES PATENT OFFICE.

IRVING S. MERRELL, OF SYRACUSE, NEW YORK, ASSIGNOR, BY MESNE ASSIGNMENTS, TO MERRELL-SOULE COMPANY, INC., OF NEW YORK, N. Y., A CORPORATION OF DELAWARE.

FOOD PRODUCT.

Application filed September 27, 1923. Serial No. 665,166.

This invention relates to certain new and novel food products in the form of unitary articles of manufacture.

The desiccation of milk has long been known and its reduction to powdered form has been commercially practiced for many years more particularly by the method known as the spray process, as described in the Stauf Patent No. 666,711, or Merrell-Merrell-Gere Patent No. 860,929, and the method known as the roller process, as described in the Gere-Merrell Patent No. 631,568.

My invention utilizes powdered milk, either whole or skim milk powder, or milk powder of any percentage of butter fat content, but preferably whole milk powder produced in any suitable manner, as for instance, by either of the processes described. It relates specifically to a milk powder product consisting of or comprising milk powder particles adhered, stuck or joined together by heat, as for instance, a usual baking process.

Altho milk in its raw state or milk solids, as for instance, in the form of powderd milk, are a very valuable and nutritious food product, many children and some adults have an aversion to liquid milk and probably no one under ordinary conditions would consider eating milk powder, particularly if raw milk is distasteful to them. Further, some people for whom a milk diet is desirable, find it difficult to take the required amount of liquid milk necessary for satisfactory nourishment. It is, therefore, a desirable object for the reasons stated, and perhaps others, to produce this healthful and nutritious food product in such a form that it may be considered more or less of a confection, or a novel product having a pleasing baked taste quite different from the taste of raw milk solids, thereby avoiding any personal antipathy to milk while retaining its nourishing food characteristics with a slight moisture content.

Milk powder when first made ordinarily contains from two to three percent of moisture, the maximum prescribed in the Government definition being 5%. A milk powder containing about 2% of moisture is found very satisfactory for my purpose, and I prefer to keep the moisture content below the Government maximum having found that the flavor of the product is rapidly impaired as the percentage of moisture becomes substantially greater.

I have discovered that it is possible to make certain new and useful food products, more specifically baked powdered milk food products, as for instance, in the form of a biscuit; using the term in the broadest sense to include any cake, loaf or food ration of any form desired. This may consist entirely of powdered milk particles, or may consist of powdered milk particles mixed with various other substances in powdered form, such as sugar, cocoa, chocolate, citrus fruit extracts, salt, fruit powders, as raspberry, etc. The biscuit may also have, as for instance, a chocolate or sugar coating.

I have discovered a process whereby said new and novel products may be produced, and have demonstrated that this new process is commercially practical, efficient and economical.

My new product is essentially a palatable, nutritious food comprising or consisting of powdered milk particles heated or baked to produce an article of manufacture.

If in the form of a biscuit of any desired shape, it is somewhat brittle, but of more or less self-sustaining character dependent upon the extent to which the powder has been compacted prior to baking. The milk powder particles of the product or article of manufacture produced as hereinafter described retain substantially their natural form or shape so that the article of manufacture or biscuit comprises a multiplicity of milk powder particles adhered, joined or stuck together on their contacting surfaces to form a more or less self-sustaining product or biscuit constituting a unitary article of manufacture.

The product has a pleasing nutty flavor somewhat different from the flavor of normal powdered milk, doubtless due to the cooking effect of the baking on the milk proteins, casein and albumen and preferably the baking is carried to the point where there is a slight change in the color of the milk powder.

The product may be produced by taking a suitable quantity of powdered milk and shaping the same to the desired form in any suitable way, as for instance, in a baking mold, and then subjecting the powder in the mold, tin or other container, to a suitable temperature for a desired period of time to effect baking of the product into a more or less self-sustaining firm, but somewhat brittle article or biscuit. Preferably, the milk powder is slightly compacted prior to baking to increase the density of the product, and thereby produce an article, as for instance, a milk powder biscuit of greater firmness and self sustaining qualities.

In the drawings of this application:—

Figure 1 is a perspective view of a mold suitable for making a satisfactory biscuit of one form and size.

Figure 2 is a similar view of the mold with the cover tilted.

Figure 3 is a cross-section on line 3—3, Figure 1.

Figure 4 is a perspective view of an article of manufacture or biscuit of my invention.

Figure 5 is a view of a similar biscuit having a coating of suitable material, such as chocolate.

In order that my invention may be thoroughly understood, I have illustrated in the drawings one form of an article of manufacture or biscuit of my invention, together with apparatus adapted for use in the process of producing the biscuit illustrated. The apparatus as shown comprises a baking mold —1— consisting of a bottom section —2— having one or more, in this instance nine, molding chambers or recesses —3— of any shape and form, dependent upon the shape and form of the biscuit desired. Preferably the bottom of these mold chambers or recesses are curved along their lower edges or boundaries to avoid sharp corners at the base of the mold chambers in which corners the milk powder would be apt to be burned or unduly baked.

The top or cover —4— of the mold may, as shown, have a substantially flat lower surface adapted to rest upon the upper surface of the section —2— and substantially close the mold chambers —3—. The mold chambers —3— may first be filled with milk powder, and preferably the powder is somewhat compacted in the mold chambers to increase the density and self-sustaining character of the resultant biscuit.

For illustration, in filling the chambers —3—, a surplus quantity of milk powder additional to that required for filling the recesses or chambers —3— may be placed or spread upon the upper surface of the mold section —2— and the cover section —4— of the mold may be placed upon this surplus powder, and sufficient pressure exerted to somewhat compress the milk powder in the mold recesses or chambers —3—. Then by sliding the cover section —4— across the bottom section —2— the surplus milk powder will be removed, or scraped off, leaving the recesses or chambers —3— filled with milk powder in somewhat compacted form. The cover —4— may then be placed upon the lower section —2— and the mold placed in any suitable oven or subjected in any suitable manner to heat for baking the contained molded milk powder.

For illustration of a satisfactory baking of a biscuit of a particular size, it is found that a very satisfactory product is produced in substantially the form illustrated in Figure 4 when the biscuit is approximately 2¾″ long, 1¼″ wide and ¼″ thick, baked in an aluminum mold of substantially the form shown, the walls of which are approximately $\frac{3}{16}$th of an inch in thickness, and when the mold, as described, is subjected to a temperature of approximately 350 degrees for a period of nineteen or twenty minutes.

Obviously the time period and the temperature stated are merely illustrative of a satisfactory interval and a suitable temperature for that interval in the production of a biscuit of particular size in a baking mold of approximately the thickness described, and a wide variation in respect to both the time period and the baking temperature is possible and necessary in the baking of articles of manufacture or biscuits of different sizes, and in molds of various degrees of conductivity and thickness.

As before stated, it is not essential that the biscuit —5— should consist entirely of milk powder particles, and for some purposes of producing various novel products, it is desirable to mix other powdered materials with the milk powder before placing it in the mold —1—. For illustration, the milk powder may be mixed with cocoa, sugar, chocolate, citrus juice powder, extracts, salt, fruit powders, as raspberry, and the percentage of the ingredients of such a mixture may be widely varied to suit different tastes and conditions so long as the product contains a substantial percentage of milk powder particles.

No attempt is here made to state positively the reasons why the separate particles of milk powder preferably after slight compacting, secure themselves together to form a self-sustaining biscuit when heated, as described, for the reason that at present the matter is more or less the subject of intelligent speculation. However, with this reservation, it is suggested that the individual particles are adhered, joined or stuck together at their contacting surfaces by a slight melting of the milk-sugar content of the particles, while the particles maintain substantially their original form, shape and nourishing food content.

A very palatable and desirable food product is produced when the biscuit —5— (which, as before stated, may be of any form and shape) is coated in any suitable manner, as by dipping with a layer of chocolate, and in Figure 5 there is illustrated a biscuit —5— having a coating —6— of chocolate thereon, a portion of the coating having been broken away to show the biscuit. The biscuit —5— may be coated with various other substances and materials, as for instance, what is ordinarily known as sugar coating, and a desirable article of food is thereby produced.

I have also embodied this invention in biscuits made from the powder of citrus fruit. The particular powder I employed was orange powder and also lemon powder made by the process described in the Fleming Patent, No. 361,238. In baking the orange and lemon powder biscuits, I used a temperature of approximately 215° F. for a period of approximately 15 minutes after slightly compacting the powder by pressure in a mold similar to that above described. The citrus powder biscuit thus produced was of substantially the same dimensions as the milk powder biscuit above described. I am expecting to apply the invention to still other powders made from liquid food products taking care to avoid any which will be impaired or rendered unpalatable by the heat applied in baking.

With such powders as do not readily adhere, a binder such as gum tragacanth may be used, as for instance egg powder mixed with 5% gum tragacanth baked 24 minutes at 350 deg. or 25% powdered dextrose and 75% egg powder baked 15 minutes at 350 deg.

Altho for the purpose of thorough disclosure, I have illustrated a particular form for my food product, together with a suitable mold for producing that product, and have for illustrative purposes described specific time intervals and temperatures for producing the particular biscuit described, I do not desire to limit myself to any of the details of this illustrative disclosure, as the product may be baked to various extents, dependent upon the character of the product desired, and may be subjected to various degrees of heat for varying periods of time, dependent upon the size and form of the biscuit, and the characteristics of the baking mold, and coating of the produced article or biscuit in the production of the product illustrated in Figure 5 may be effected in various ways and with various materials, all within the scope of my invention, as set forth in the appended claims.

I claim:

1. A food product of any desired form comprising a multiplicity of milk powder particles having substantially their normal shape and nourishing food content, adhered together on their contacting surfaces by the application of heat and without the addition of liquid to form a unitary self-sustaining product.

2. As a new article of manufacture, a self-sustaining solid containing a multiplicity of powder particles having substantially their normal shape adhered together on their contacting surfaces by the application of heat and without the addition of liquid to form a unitary self-sustaining product.

3. As a new article of manufacture, a self-sustaining solid containing a baked compressed powder derived from a liquid food product.

4. As a new article of manufacture, a self-sustaining solid containing a compressed baked milk powder.

5. The process of producing a new article of manufacture comprising baking a substantially dry milk powder to form a unitary self-sustaining article of manufacture.

6. The process of producing a new article of manufacture comprising baking a molded milk powder to form a unitary self-sustaining article of manufacture.

7. The process of producing a new article of manufacture comprising baking a molded powder derived from a liquid food product to form a unitary self-sustaining article of manufacture.

8. The process of producing a new article of manufacture comprising baking a powder derived from a liquid food product in a substantially dry condition and without the addition of liquid to form a unitary self-sustaining article of manufacture.

In witness whereof I have hereunto set my hand this 24th day of September, 1923.

IRVING S. MERRELL.